United States Patent [19]

Horst

[11] Patent Number: 4,865,651
[45] Date of Patent: Sep. 12, 1989

[54] METHOD OF MAKING AN ALUMINUM BASE ALLOY ANODE

[75] Inventor: Ralph L. Horst, New Kensington, Pa.

[73] Assignee: Aluminum Company of America, Pittsburgh, Pa.

[21] Appl. No.: 194,732

[22] Filed: May 17, 1988

Related U.S. Application Data

[62] Division of Ser. No. 77,590, Jul. 24, 1987, Pat. No. 4,792,430.

[51] Int. Cl.$^4$ .............................................. C22F 1/04
[52] U.S. Cl. ................................. 148/2; 148/11.5 A
[58] Field of Search ............... 148/2, 11.5 A, 437; 420/528, 548; 429/218; 204/148

[56] References Cited

U.S. PATENT DOCUMENTS

| | | | |
|---|---|---|---|
| 2,754,202 | 7/1956 | Schluchter | 420/548 |
| 3,186,836 | 6/1965 | Pryor et al. | 420/548 |
| 3,189,486 | 6/1965 | Pryor et al. | 429/199 |
| 3,240,688 | 3/1966 | Pryor et al. | 204/148 |
| 3,282,688 | 11/1966 | Pryor et al. | 420/548 |
| 3,368,952 | 2/1968 | Pryor et al. | 204/148 |
| 3,393,138 | 7/1968 | Hine | 204/148 |
| 3,513,031 | 5/1970 | Zaromb | 136/86 |
| 3,595,608 | 7/1971 | Pryor | 420/528 |
| 4,084,963 | 4/1978 | Anthony | 420/548 |
| 4,150,204 | 4/1979 | Moden et al. | 429/218 |
| 4,211,827 | 7/1980 | Pryor et al. | 420/548 |

FOREIGN PATENT DOCUMENTS

| | | | |
|---|---|---|---|
| 863864 | 2/1971 | Canada . | |
| 209402 | 1/1987 | European Pat. Off. . | |
| 3507956 | 10/1985 | Fed. Rep. of Germany | 420/548 |
| 72705 | 6/1979 | Japan | 420/548 |
| 85838 | 5/1984 | Japan | 420/548 |

OTHER PUBLICATIONS

Keir et al., "Galvanic Corrosion Characteristics of Aluminum Alloyed with Group IV Metals", *Journal of Electrochem. Soc.*, 114, (8), 777, 1967.

*Primary Examiner*—Robert Mc Dowell
*Attorney, Agent, or Firm*—Douglas G. Glantz; Arnold B. Silverman

[57] ABSTRACT

An aluminum alloy that may be used as an anode in a battery displays high voltage and high coulombic efficiency when used with a caustic electrode by the presence of about 0.03 to 0.2 percent tin. Additionally, about 0.03 to 0.07 percent gallium and/or 0.002 to 0.006 percent silicon may be added. It is preferred that the purity of the aluminum be at least as pure as 99.995%. A heat treatment enhances voltage and efficiency.

8 Claims, No Drawings

METHOD OF MAKING AN ALUMINUM BASE ALLOY ANODE

This is a division of application Ser. No. 77,590, filed July 24, 1987, U.S. Pat. No. 4,792,430.

BACKGROUND OF THE INVENTION

1. Field of the Invention

This invention relates to an aluminum alloy, and more specifically to an alloy usable in an aluminum anode.

2. Description of the Prior Art

The use of aluminum alloys in batteries is well known. Aluminum is a preferred material for battery anodes because of its high energy content and low cost. However, problems with voltaic efficiency in protic solvents and coulombic inefficiency have prevented wide commercial use of these aluminum anodes. See U.S. Pat. No. 3,513,031.

Aluminum-tin alloys have been studied for possible use as galvanic anodes in seawater, however, these alloys have produced very low efficiencies. See Keir et al, "Galvanic Corrosion Characteristics Of Aluminum Alloyed With Group IV Metals", Journal Of Electrochem. Soc., 114, (8), 777, 1967.

It is preferred that aluminum-air batteries have high voltage and high coulombic efficiency. However, one of these characteristics is usually sacrificed at the cost of the other characteristic. The use of gallium to increase voltage in aluminum anode alloys is known. See U.S. Pat. No. 3,393,138. U.S. Pat. No. 4,150,204 discloses an aluminum alloy anode preferably containing 0.001 to 0.072 percent by weight of gallium used in seawater cells. The purity of aluminum is 99.997 percent. Alternatively the aluminum may have incidental impurities.

Many aluminum alloys incorporate tin in order to create higher galvanic currents. See U.S. Pat. Nos. 3,282,688, 3,368,952, and 3,189,486. U.S. Pat. No. 3,186,836 discloses an aluminum-tin alloy which contains less than 0.05 percent silicon and less than 0.1 percent iron.

U.S. Pat. No. 3,240,688 discloses an aluminum based alloy which contains 0.04 to 0.5 percent tin, 0.005 to 1.0 percent gallium. The tin is retained in solid solution to the maximum degree of 0.1 percent.

Canadian Pat. No. 863,864 discloses an aluminum based alloy which contains 0.04 to 0.5 percent tin; 0.001 to 0.1 percent boron, a lattice expander selected from the group consisting of magnesium, gallium, zirconium, bismuth, indium and mixtures thereof; 0 to 0.25 percent to transition metal, 0 to 0.10 percent silicon and 0 to 0.10 percent iron.

In spite of these prior disclosures, there remains a need for aluminum anode alloy which produces high voltages, high coulombic efficiency and reduces gas blockage in the electrolyte passages.

SUMMARY OF THE PRESENT INVENTION

The present invention has met the above-described need by providing an aluminum base alloy comprising about 0.03 to 0.2 percent tin. The additional presence of about 0.03 to 0.07 percent gallium creates enhanced properties. In one aspect, Silicon is added to the alloy in amounts of about 0.002 to 0.006 percent. In one aspect, the purity of the aluminum preferably is at least about 99.995 percent.

It is an object of this invention to provide an improved aluminum base alloy which can be used as an anode in a mechanically rechargeable battery, preferably a high-discharge short-life battery, such as is used in a torpedo.

It is an object of this invention to provide an aluminum base alloy with high voltage characteristics.

It is an object of this invention to provide an aluminum alloy with high coulombic efficiency.

It is an object of this invention to provide an aluminum alloy with reduced gassing.

It is an object of this invention to provide an aluminum alloy with tin content being about 0.03 to 0.2 weight percent that is used as an anode with a caustic electrolyte.

It is an object of this invention to provide an aluminum base alloy with tin and gallium as alloying constituents.

It is an object of this invention to provide an aluminum alloy with tin, gallium, and silicon.

It is an object of this invention to provide an economical aluminum alloy suitable for use as an anode with a caustic electrolyte.

These and other objects of the present invention will be more fully understood from the following description of the invention.

DESCRIPTION OF THE PREFERRED EMBODIMENT

All references herein to percentages of a constituent present in an alloy are weight percent.

While, in general, it is contemplated that the present invention will be used primarily as an alloy for anodes in mechanically rechargeable batteries, such as aluminum-air batteries, the alloy may be used in a wide variety of other environments such as an emergency back-up energy source, for example.

The alloy of the present invention is a lightweight, galvanic material preferably used an an anode for a fuel cell.

The alloy of the present invention produces a high voltage and high coulombic efficiency in an alkaline electrolyte. In strongly alkaline electrolyte, such as 4M or higher, the alloy exhibits an unexpectedly high efficiency. Sodium hydroxide, potassium hydroxide, caustic soda, and the like may be used as electrolyte. Optionally, sodium stannate may be added to the electrolyte. The alloy comprises about 0.03 to 0.2 percent tin the remainder being at least 99.995% pure aluminum. About 0.03 to 0.07 percent gallium may be added. Silicon in an amount of about 0.002 to 0.006 percent may also be added. The alloy may be advantageously employed as an anode in a caustic electrolyte cell.

Aluminum is used in anode alloys because it is plentiful, relatively inexpensive, and possesses a high energy content.

To further increase the efficiency, it is preferred that the purity aluminum be at least about 99.995 percent. The increased purity leads to increased coulombic efficiency. Aluminum may contain impurities such as heavy transition elements such as iron, copper, zinc, lead, and nickel. These impurities create galvanic cells on the aluminum anode which tends to produce local reduction of water which in turn reduces coulombic efficiency. It is preferred that iron be present in the alloy only up to about 10 ppm; zinc up to about 10 ppm; and lead up to about 2 ppm.

Gallium may be added to the hereinbefore described aluminum-tin alloy. Gallium is a low melting element that forms a eutectic with aluminum at 20° C. The presence of gallium creates an unexpectedly high voltage and coulombic efficiency. Gallium is present in the alloy in a range of about 0.03 to 0.07 weight percent, and preferably about 0.05 to 0.07 weight percent.

The presence of tin in an alloy improves coulombic efficiency and voltage in a caustic electrolyte. Tin is preferable present in the alloy in amounts of about 0.03 to 0.2 percent and more preferably about 0.05 to 0.1 percent.

The presence of silicon serves to keep the gallium in a solid state. When silicon ties up the gallium, migration towards grain boundaries is retarded. Migration of gallium towards grain boundaries creates a condition that reduces coulombic efficiency. Silicon is preferably present in the alloy in amounts of about 0.002 to 0.006 percent and more preferably about 0.003 to 0.006 percent.

The alloy of the present invention may be cast by melting aluminum at at least about 1300° F. to 1400° F. in a graphite crucible lined with a liner that prevents contamination from the crucible. The alloying elements are slowly added in any desired sequence. The molten alloy is preferably stirred until the mixture is homogeneous, preferably for at least about an hour. The molten alloy is poured into a mold and allowed to cool and solidify. The ingot is removed from the mold.

Preferably, the ingot is preheated to at least about 650° F. and hot-rolled to sheet. The sheet is then cold-rolled to a final 20 mil thickness. The alloy may be used at this point. Preferably 20-mil sheet is annealed to at least about 700° F., quenched in cold water, and flattened.

Alternatively, and more preferably, after hot-rolling, the alloy is homogenized or solution stabilized at least about 1150° F. for about 15 minutes and then cold water quenched. The alloy may then be cold rolled to final thickness. The homogenization increases the uniformity and the coulombic efficiency of the alloy.

EXAMPLE 1

The following are suitable specific alloys of the present invention:

| | | |
|---|---|---|
| (a) | about 0.1% tin in | |
| | remainder 99.995% pure aluminum | |
| (b) | tin | about 0.1% |
| | gallium | about 0.05% in |
| | 99.995% pure aluminum | |
| (c) | tin | about 0.1% |
| | gallium | about 0.05% |
| | silicon | about 0.005% in |
| | about 99.995% pure aluminum | |

EXAMPLE 2

The following data were obtained from the alloys of the present invention. The alloys were produced in the hereinbefore described manner.

The alloy was cast, not scalped, preheated to at least 650° F., and hot-rolled to 125 mils.

After hot-rolling to 125 mils, Sample-A was immediately cold-rolled to 20 mils, then annealed by heating to at least 700° F. for 15 minutes and quenched in cold water.

Sample B was solution stabilized at 1150° F. for 2 minutes, quenched in cold water, and then cold-rolled to a final thickness of 20 mils.

The voltages are those measured under load at or near 800 Ma/cm². The coulombic efficiencies were measured by the weight loss method. Electrochemical tests were conducted in triplicate in a flowing solution of 4M NaOH and 0.06M sodium stannate at 140° F. (60° C.).

| Alloy | -A Annealed 20-mil Sheet | | -B Solution Stabilized Prior To Cold Rolling | |
|---|---|---|---|---|
| | V (Ag/AgO) | Eff. % | V (Ag/AgO) | Eff. % |
| RX-808 (a product of Reynolds) 0.05 Ga—0.8Mg | 1.704 | 93 | — | — |
| 0.1 Sn | — | — | 1.628 | 98 |
| 0.1 Sn—0.05 Ga | 1.709 | 97.7 | 1.695 | 100 |
| 0.1 Sn—0.05 Ga | 1.761 | 98.3 | 1.765 | 99.0 |
| 0.1 Sn—0.05 Ga—0.005 Si | 1.713 | 97.9 | 1.816 | 99.3 |

The annealing treatment also provided increased voltage and coulombic efficiency. As can be seen in the table, the Sn-Ga-Si alloy responded to the solution stabilization treatment (-B) by showing an increase in voltage to 1.816 volts.

It will be appreciated therefore that a 99.995% pure aluminum alloy alloyed with about 0.03 to 0.2 percent tin may be advantageously used as an anode in a caustic electrolyte to achieve enhanced voltage and high coulombic efficiency. Gallium may be added to this alloy in amounts of about 0.03 to 0.07 percent. In addition, silicon may be added in an amount of about 0.002 to 0.006 percent to achieve these characteristics.

Whereas particular embodiments of the invention have been described above for purposes of illustration, it will be appreciated by those skilled in the art that numerous variations of the details may be made without departing from the invention as described in the appended claims.

I claim:

1. A method of making an aluminum base alloy anode comprising
   providing a bath of molten aluminum,
   adding to said molten aluminum bath about 0.03 to 0.2 percent tin,
   adding to said molten aluminum bath about 0.03 to 0.07 percent gallium,
   stirring said bath to produce a molten alloy,
   pouring said molten alloy into a mold,
   allowing said alloy to solidify,
   removing the ingot from said mold,
   hot-rolling said ingot,
   cold-rolling said ingot to a final thickness,
   annealing said ingot,
   cold water quenching said ingot, whereby said anode has enhanced voltage and coulombic efficiency.

2. The method of claim 1 including adding to said molten aluminum about 0.002 to 0.002 percent silicon.

3. The method of claim 1 including hot-rolling said ingot at least about 650° F.

4. The method of claim 1 including annealing said ingot at least about 700° F.

5. A method of making an aluminum base alloy anode comprising
   providing a bath of molten aluminum,
   adding to said molten aluminum bath about 0.03 to 0.2 percent tin,
   adding to said molten aluminum bath about 0.03 to 0.07 percent gallium, stirring said bath to produce a molten alloy,
pouring said molten alloy into a mold,
allowing said alloy to solidify,
removing the ingot from said mold,
hot-rolling said ingot,
solution stabilizing said ingot,
cold water quenching said ingot,
cold-rolling said ingot to a final thickness, whereby said anode has enhanced voltage and coulombic efficiency.

6. The method of claim 5 including adding to said molten aluminum about 0.002 to 0.006 percent silicon.

7. The method of claim 5 including hot rolling said ingot at least about 650° F.

8. The method of claim 5 including solution stabilizing said ingot at least about 1150° F.

* * * * *

UNITED STATES PATENT AND TRADEMARK OFFICE
CERTIFICATE OF CORRECTION

PATENT NO. : 4,865,651

DATED : September 12, 1989

INVENTOR(S) : RALPH L. HORST

It is certified that error appears in the above-identified patent and that said Letters Patent is hereby corrected as shown below:

Claim 2, column 4, line 57, "0.002" (second occurrence) should be --0.006--.

Signed and Sealed this

Tenth Day of July, 1990

Attest:

HARRY F. MANBECK, JR.

Attesting Officer

Commissioner of Patents and Trademarks